United States Patent [19]

Gindy et al.

[11] Patent Number: 4,659,411

[45] Date of Patent: Apr. 21, 1987

[54] BONDING OF STRAIN GAGES

[75] Inventors: Sherif S. Gindy; Kishan D. Amlani, both of Troy; Thomas J. Ellwood, Mt. Clemens, all of Mich.

[73] Assignee: Eaton Corporation, Cleveland, Ohio

[21] Appl. No.: 655,620

[22] Filed: Sep. 28, 1984

[51] Int. Cl.⁴ .............................................. B32B 31/00
[52] U.S. Cl. ..................................... 156/285; 156/299
[58] Field of Search ............... 156/285, 286, 105, 382, 156/299; 338/2

[56] References Cited

U.S. PATENT DOCUMENTS 3,281,296 10/1966 Jameson ................................ 156/105
3,322,598 5/1967 Marks et al. ......................... 156/382
3,433,699 3/1969 Rumble ..................................... 338/2
3,950,204 4/1976 Williams ................................. 156/285
4,407,686 10/1983 Cook et al. .............................. 338/2

Primary Examiner—Michael Ball
Attorney, Agent, or Firm—D. A. Rowe; A. E. Chrow

[57] ABSTRACT

A method of installing foil type electrical strain gages wherein adhesive is applied and the gage pressed about is periphery to provide a fluid pressure seal. The gage and the structure are then pressurized directly in a fluid pressure vessel chamber and the pressure maintained while the vessel is heated to provide full curing of the adhesive.

5 Claims, 5 Drawing Figures

BONDING OF STRAIN GAGES

BACKGROUND OF THE INVENTION

The present invention relates to methods of bonding strain gages to members to be strained; and, in particular relates to adhesive bonding of foil-type electrical resistant strain gages to the strained structural member.

Heretofore, it has been common practice to bond the aforesaid foil-type strain gages to the member to be strained by placing a suitable bonding material such as an air curing adhesive on the reverse side of the foil strain gage, positioning the gage onto the structure to be strained and applying mechanical pressure to hold the gage in place while the adhesive is permitted to cure. Typically, padded mechanical clamps have been used to hold the gages in place and to apply the pressure thereon. However, it has been found difficult where mechanical clamping is used to obtain uniform pressure over the surface of the strain gage. Furthermore, the use of mechanical clamps has made it extremely difficult to maintain application of the same pressure from gage to gage. The result has been poor uniformity in electrical performance of the gages and in some cases has resulted in nonrepeatability of the gage readings due to imperfect bonding of the gage to the structure to be strained.

SUMMARY OF THE PRESENT INVENTION

The present invention provides an improved technique for bonding of foil-type electrical strain gages to a member to be strained in a manner which improve the uniformity of bonding. The method of the present invention provides a simplified process of installing strain gages which eliminates the need for mechanical clamping.

In the present invention, adhesive is applied to the back of the foil strain gage which is applied to the member to be strained and fluid pressure is applied directly to the surface of the strain gage and members to be strained and the entire assembly is raised to an elevated temperature with fluid pressure maintained thereon. The combination of direct fluid pressure and elevated temperature enhances the curing of the adhesive and the fluid pressure maintains a uniformly distributed load over the foil strain gage to provide improved bonding to the structural member to be strained. The present invention renders itself particularly applicable to strain gage load cells and test specimens employed for tensile and compressive load testing where the load cell or test specimen may be conveniently positioned in an oven and pressurized while in the oven for providing a uniformly distributed load over the strain gage to thereby maintain the adhesive to a thin film configuration.

BRIEF DESCRIPTION OF THE DRAWINGS

FIG. 5 is a section view taken along section indicating lines 5—5 of FIG. 4.

DETAILED DESCRIPTION

Figure 1:
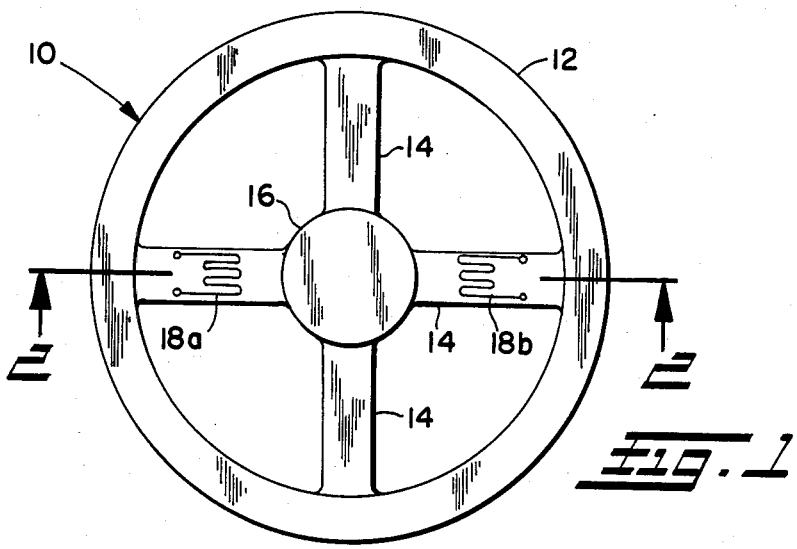
FIG. 1 is a plan view of a load cell structure showing strain gages bonded to the flexural webs thereon.

Referring now to FIG. 1, a sensing element of a load cell is indicated generally at 10 as having an annular reaction rim 12 with a plurality of radial flexural webs or spokes 14 disposed thereabout and extended inwardly therefrom for supporting a central load receiving block 16. The flexural webs 14 are preferably disposed in circumferentially equally spaced arrangement, as shown by the four webs 14 spaced at 90° in FIG. 1; and, at least two of the webs have bonded thereto strain gages indicated by the reference numberal 18 in FIG. 1.

Figure 2:
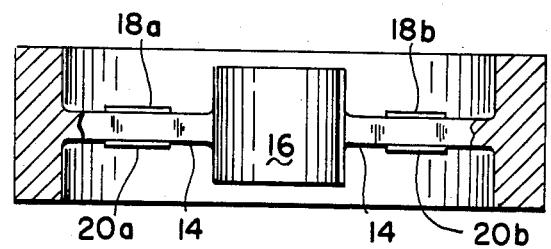
FIG. 2 is a section view taken along section indicating lines 2—2 of FIG. 1; and, FIG. 3 is a sectional view of the device of FIG. 1 encased in a pressure vessel and enclosed in an oven.

Referring now to the sectional view FIG. 2, the strain gages 18a, 18b are shown as mounted on the upper surface of the opposing webs 14 and a second pair of strain gages 20a, 20b are shown as mounted on the lower surface of the webs 14. These gages may be connected in any desired arrangement in suitable Wheatstone bridge circuitry (not shown) for measuring the change in resistance and thus strain.

Figure 4:
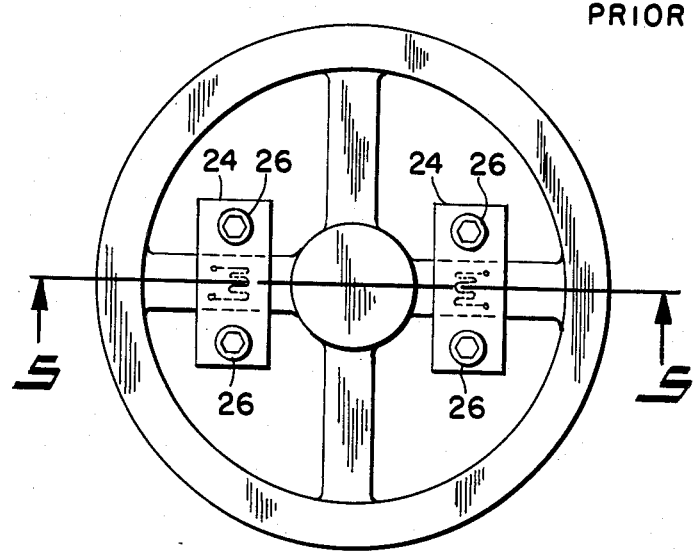
FIG. 4 is a view similar to FIG. 1 showing the prior art mechanical clamping technique.

With reference to FIGS. 4 and 5, the prior art technique employed for bonding the strain gages 18a, 18b, 20a, 20b to the flexural webs 14 is illustrated wherein each of the strain gages has a rubber pad 22, received thereover with a clamping plate 24 applied over the rubber pad. The clamping plates disposed on opposite sides of the webs 14 are clamped together by two bolts 26 which apply direct mechanical pressure to the plates and rubber pads for compressing the strain gages against the upper and lower surfaces of the flexural webs 14. The prior art technique shown in FIGS. 4 and 5 thus relies upon mechanical clamping to provide pressure over the surface of the strain gage during the time in which the adhesive is curing.

Figure 3:
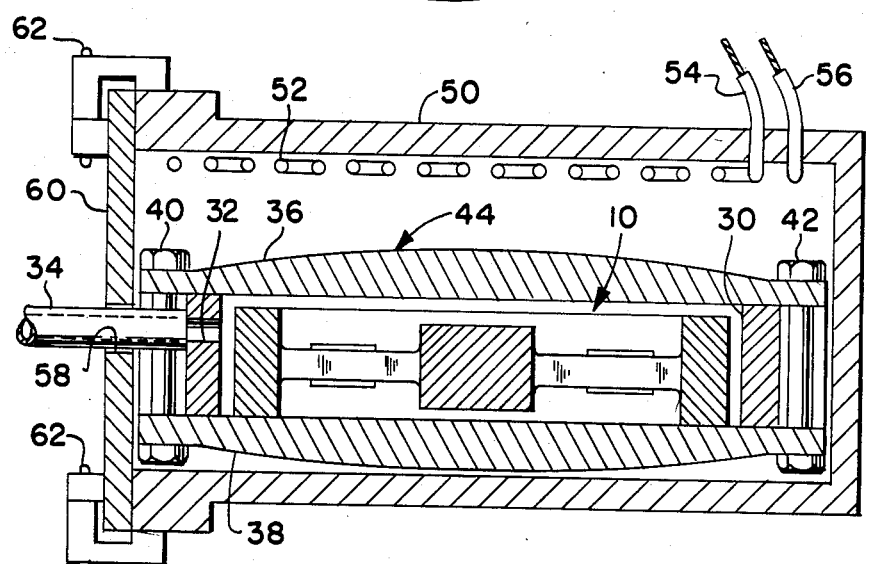
Figure 3:
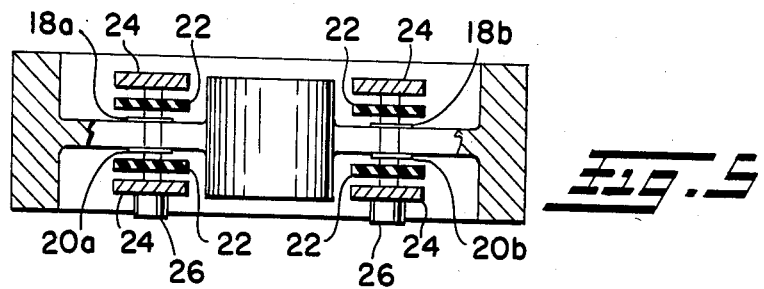

Referring now to FIG. 3, the load cell 10 of the present invention is shown encased in a suitable pressure vessel indicated generally at 44 formed by cylindrical wall 30 having a fluid pressure port 32 therethrough with a suitable conduit 34 connected thereto. End covers 36, 38 are retained over the cylindrical wall 30 by suitable retainers such as bolts 40, 42. The pressure vessel 44 is received in a walled oven 50 which has a suitable means for heating provided such as electrical heating element 52 disposed there within. Electrical leads 54, 56 extend through the wall of the oven for connection of the element 52 to a source of electrical power. It will be understood that more than one load cell 10 may be received in the vessel 44 if desired.

The conduit 34 extends through an aperture 58 provided in the cover 60 for the oven 50. The cover 60 is pivoted about hinge pins 62 to permit opening of the closure of the oven and insertion or removal of the fluid pressure vessel 44.

In the presently preferred practice of the method of the invention, a suitable adhesive such as an anaerobic adhesive is applied on the backing of each strain gage and on the appropriate areas of the surface of the member to be strained; and, the strain gages are laid on the surface of the member. In the present practice the invention, it has been found satisfactory to employ BR610 adhesive Micromeasurements, manufactured by the Micromeasurements Company, P.O. Box 27777, Raleigh, N.C. 27611 or other suitable epoxy adhesive for bonding the strain gages to the surface of the member to be strained.

If desired, the adhesive may be permitted to partially air cure to a tacky state before the strain gages are applied to the surface of the member to be strained. The strain gage is firmly pressed over its surface, particularly about its periphery to effect an initial adhesive seal thereabout to resist entry of pressurized fluid between the gage and the surface to which the gage is to be bonded.

The load cell or member to be strained with the strain gage adhesively bonded thereto is placed in the pressure vessel 44 and is pressurized by positive air pressure to a level of 40-90 psig. The pressure is maintained within the chamber in the aforesaid range preferably by the use of a pressure regulator on the supply line or conduit 34, or on a vent port not shown.

While the apparatus is maintained in the vessel 44, the temperature within the oven 50 is elevated to a level of 340° F. The elevated temperature is maintained for sufficient time such that the adhesive bonding the strain gage to the load cell is completely cured under the force of the fluid pressure acting on the surface of the strain gage. It has been found satisfactory in the present practice of the invention to maintain the curing temperature for a period of three (3) hours. It will be understood however, that other combinations of time and temperature may also be employed depending upon the curing properties of the particular adhesive employed.

The adhesive applied to the strain gage effects a seal around the edge of the strain gage such that fluid pressure acts on the surface of the gage presses the strain gage against the surface to which it is bonded. This pressure results in a thin well dispursed layer of adhesive between the strain gage and the surface of the members to be strained.

The present invention thus provides a unique and novel technique for utilizing fluid pressure acting directly on the surface of the strain gage to provide the clamping force uniformly distributed over the surface of the strain gage to thereby produce a uniform and strong bond of the strain gage to the member to be strained. The present invention thus eliminates the need for special positioning or clamping devices for installing strain gages.

Although the invention has hereinabove been described with respect to the preferred practice, modification and variation of the invention may be made and the invention is limited only by the following claims.

We claim:

1. A method of attaching an electrical strain gage to a structure to be strained comprising the steps of:
    (a) providing a foil-type strain gage;
    (b) applying an adhesive to the surface of one of said foil-type gage and the surface of said structure;
    (c) applying said foil to said structure with said adhesive and pressing about the surface and periphery of said foil to effect an initial fluid pressure seal;
    (d) applying positive fluid pressure directly to the exterior surfaces of said gage and said structure to press said gage against said structure;
    (e) maintaining said fluid pressure and heating said gage until said adhesive is fully cured.

2. The method defined in claim 1, wherein said step of applying fluid pressure comprises inserting said structure in a vessel and pressurizing the interior thereof to pressures in the range 40-90 psig.

3. The method defined in claim 1, wherein the step of heating comprises said structure to a temperature of at least 340° F. (171° C.) for about three hours.

4. The method defined in claim 1, whereinsaid step of applying adhesive comprises applying an anaerobic adhesive.

5. The method defined in claim 1, wherein said step of applying adhesive includes the step of partially curing said adhesive to a tacky state.

* * * * *